United States Patent [19]
LaBarba

[11] 3,990,495
[45] Nov. 9, 1976

[54] INSULATED WARMER AND SERVER RECEPTACLE

[76] Inventor: Georgene L. LaBarba, 613 27th St., Manhattan Beach, Calif. 90266

[22] Filed: Oct. 30, 1975

[21] Appl. No.: 627,030

[52] U.S. Cl. .................................. 150/2.2; 150/2.1; 150/52 R
[51] Int. Cl.² ........................................ B65D 33/24
[58] Field of Search .................. 150/2.1, 2.2, 52 R; 220/9 D

[56] References Cited
UNITED STATES PATENTS

| | | | |
|---|---|---|---|
| 1,956,395 | 4/1934 | Montgomery | 220/9 D |
| 2,131,855 | 10/1938 | Hummel | 150/2.1 |
| 2,661,785 | 12/1953 | Daust | 150/2.1 |
| 3,189,074 | 6/1965 | Schaefer | 150/52 R |
| 3,428,103 | 2/1969 | Walsh | 150/2.2 |
| 3,507,312 | 4/1970 | Petersen | 150/52 R |

*Primary Examiner*—Ro E. Hart
*Attorney, Agent, or Firm*—Huebner & Worrel

[57] ABSTRACT

An insulated warmer and server receptacle for cooking dishes which receptacle includes a sewn fabric exterior envelope of an appropriate generally contoured shape. The envelope includes pockets therein to removably receive insulation material which envelope will surround the sides and bottom of a cooking dish whereby food therein will remain warm after removal from a stove and will also serve to protect hands when holding the dish or serving from it.

5 Claims, 5 Drawing Figures

INSULATED WARMER AND SERVER RECEPTACLE

BACKGROUND OF THE INVENTION

Heretofore in the serving of casserole dishes or oven heated ware, there have been regular insulated pads known as hot mats which are generally regular in shape such as square or round and containing some type of an insulation material. The mat may be wrapped around the edge of a casserole to hold it when removing it from the oven and carrying it to a table. Additionally, there have in the past been gloves of an insulated type such as barbecue gloves, etc., where the casserole can be gripped for removing it from the oven.

In addition, when the hot casserole is placed on the table it is normally desirable to have some type of insulated material between the casserole and the table to prevent burning and discoloration thereof. This in the past has been taken care of by trivets of various types which are elevated above the table and which will allow the hot dish to sit on it without hitting the table.

However, in none of the aforementioned devices is there any provision made for retaining the heat from the casserole during the time it is on the table and the food is served from it.

In the past, there have been devices available which do help to retain the heat in the casserole during serving such as the type where a rack is provided to set the casserole in and underneath are candles or other heating elements. Further, there have been provided in the past insulated dishes such as Thermos. Further, there are certain trivets known as electrical trivets which have a mild current passing therethrough.

However, again in none of these devices is there provision for a flexible holder to grip the casserole while it is moved from the oven to the table.

SUMMARY OF THE INVENTION

The present invention includes structure which may be utilized with a casserole or cooking dish where it is removed from the oven and placed in the warmer and server receptacle and may be physically carried to the table by use of the device and where it will act to insulate the dish from the table and prevent damage thereto as well as to keep the food within the casserole warm and retain the warmth during serving.

Another advantage is the provision of a structure which is pleasing to the eye and acceptable on a table during a meal.

Another advantage of the present warmer and server receptacle is that the structure provided is such that the weight of the dish on installation therein underneath the cooking dish will prevent it from sliding when on a table whereby accidents could occur and food is spilled from the dish. This is particularly important when a dish may contain food with more than the normal liquid therein.

A further advantage of the warmer and server receptacle is the fact that when not in use it may be collapsed and compressed for storage taking up little space.

These and other objects and advantages will become apparent from the following description and drawings wherein:

DETAILED DESCRIPTION OF THE PREFERRED EMBODIMENTS

Figure 1:
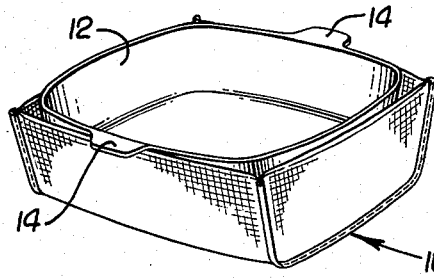
FIG. 1 is a perspective view of a casserole or cooking dish positioned within the present invention.

There is generally illustrated in FIG. 1 the subject matter of this invention in the form of an insulated warmer and server receptacle generally designated 10. Mounted within the warmer and server receptacle 10 is a casserole or cooking dish 12 which in the illustrated form is generally rectangular with the walls being slightly curved outwardly and tapered inwardly from the top to the bottom. As is customary with casserole dishes 12 there are a pair of opposed handle portions 14 to grip the casserole for removing it from the oven after the food ingredients contained within the dish 12 are cooked.

As can be seen from FIG. 1 it is generally preferable that the warmer and server receptacle 10 be of such a height as to correspond with the height of the casserole dish 12. This, coupled with an area dimension of the warmer and server receptacle 10 comparable with the exterior dimension of the casserole 12, will assure a retention of the food heated within the casserole 12 during serving.

Figure 2:
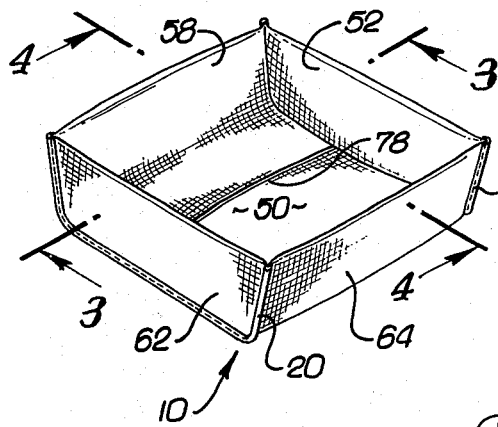
FIG. 2 is a perspective view of the warmer and server receptacle per se.
Figure 5:
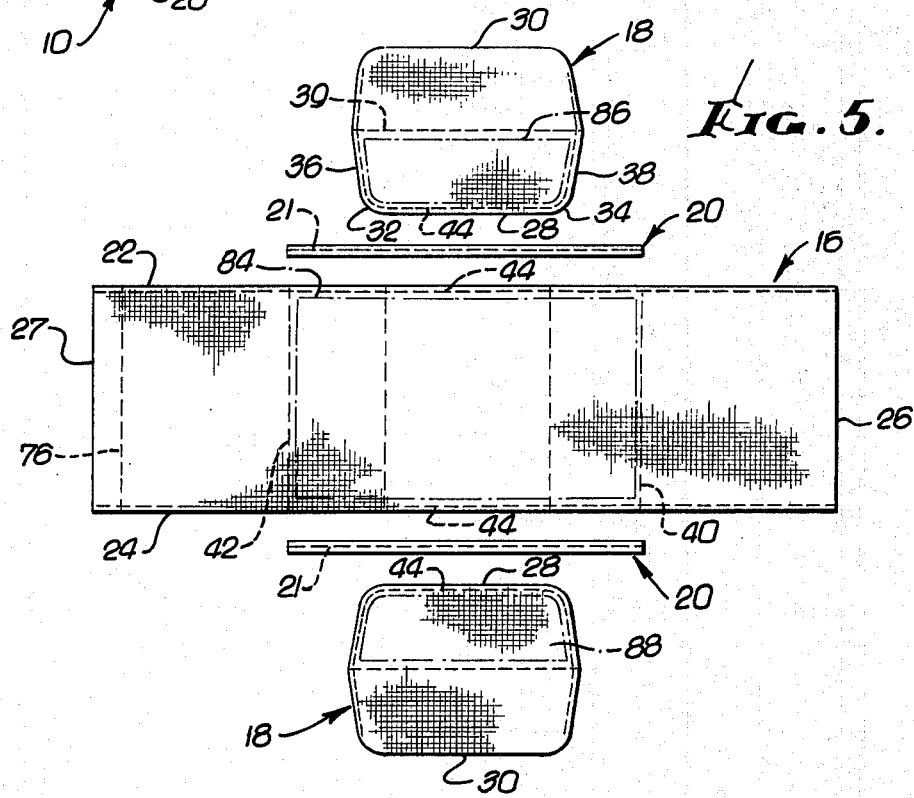
FIG. 5 is an exploded view of the pieces of material or patterns which are used in the preparation of the warmer and server receptacle, the ghost lines thereon representing the shape and positioning of the insulation material as it is utilized in the invention.

In the construction of the preferred embodiment of this invention there are several fabric pieces or patterns, illustrated in FIG. 5, which are folded and/or sewn together to form the finished structure which is best seen in FIGS. 1 and 2. In effect, the warmer-server receptacle 10 is a fabric envelope formed with pockets to receive insulation material.

The fabric pieces are cut into patterns each of which are illustrated in FIG. 5 and may be of any particular type of colored fabric which is washable if food spills on the fabric. In addition, the insulation material can also be washed when necessary. The pieces of the embodiment illustrated includes an elongated base and end pattern generally designated 16 of fabric, a pair of side patterns generally designated 18 of preferably identical exterior cuts and two pieces of biasing binding generally designated 20 having center fold lines 21.

Figure 4:
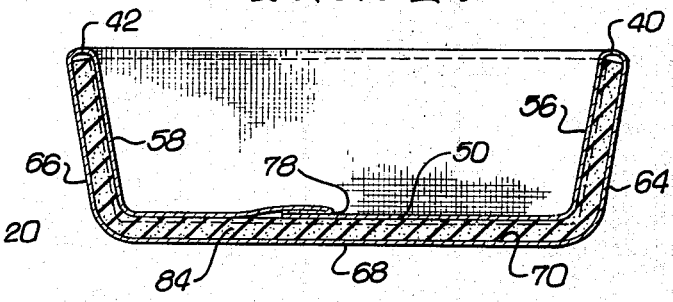
FIG. 4 is a cross sectional view taken on lines 4—4 of FIG. 2 showing the construction of the warmer and server receptacle.

In more detail, the base and end pattern 16 are preferably of one piece but can be made of several pieces appropriately sewn together. The pattern 16 includes a pair of opposed parallel elongated sides 22 and 24 and a pair of opposed parallel ends 26 and 28 all forming a rectangle of material. Each of the side patterns 18 include opposed parallel edges 28 and 30. At each end of the edges 28 and 30 the pattern is cut with curved ends 32 and 34 and sides 36 and 38 extend upwardly and outwardly half of the distance between the edge 28 and 30. The outward taper of sides 36 and 38 between ends 32 and 34 and center fold line 39, will form the taper of the finished receptacle 10 as seen in FIGS. 1, 2 and 4. The pattern 18 is folded along the center line 39 for sewing and the distance between the edge 28 and the folded line 39 approximates the height of the dish 12.

The same dimensions and folding procedure is repeated with the other side blank 18.

Next the pattern 16 is folded along fold lines 40 and 42 whereby the respective ends 26 and 28 are folded inwardly toward each other and the ends actually overlap.

The patterns 16 and 18 in the folded conditions just described are then ready for sewing to complete the receptacle 10. In order to accomplish this, edge 22 between fold lines 40 and 42 is sewn as represented by dashed lines 44 to side 38 around corner 34, edge 28, corner 32 and side 36. Edge 30 is not sewn but left open. In order to bind the thus sewn edges and sides and to reinforce the receptacle 10, biasing binding 20 is folded along line 21 overlapping the ends and is sewn in place.

The same procedure is repeated for the other pattern 18 and edge 24 of pattern 16 in order to complete the receptacle. The completed receptacle 10 has a bottom inner fabric section 50, opposed side inner generally vertical fabric sections 52 and 54, opposed outwardly tapered inner fabric sections 56 and 58, opposed outer generally vertical fabric sections 60 and 62, opposed outwardly tapered outer fabric sections 64 and 66, and bottom outer fabric section 68.

Figure 3:
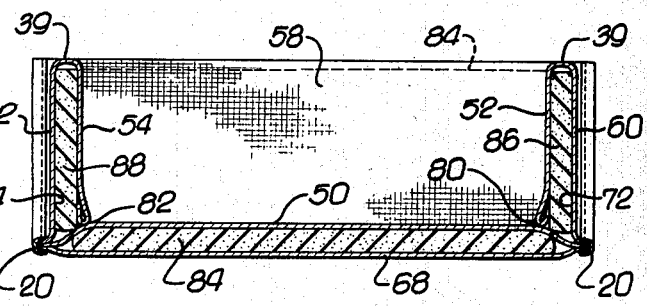
FIG. 3 is a cross sectional view taken on line 3—3 of FIG. 2, showing the construction of the warmer and server receptacle.

With the folded and sewn patterns 16 and 18 into the aforedescribed configuration it can be seen from FIGS. 3 and 4 that a fabric envelope structure is created between the respective sections. The envelope is in this embodiment divided into three insulation receiving pockets 70, 72 and 74.

Pocket 70, best seen in FIG. 4, extends between outwardly tapered fabric sections 56 and 64, continues between fabric sections 50 and 68 and upwardly between outwardly tapered fabric sections 58 and 66. Pocket 72, best seen in FIG. 3, extends vertically between inner and outer fabric sections 52 and 60. Pocket 74, best seen in FIG. 3, which is generally identical in shape and size extends vertically between inner and outer fabric sections 54 and 62.

In order to have access to the respective pockets 70, 72 and 74 and to provide for the eversibility thereof, openings are provided. With regard to pocket 70, the end 28 of the pattern 16 is folded over along line 76 and tucked under such as seen in FIG. 4 resting on end 26 of pattern 16. As the fabric is not sewn together a lateral opening 78 is created across the bottom 50 of the receptacle 10.

With regard to pockets 72 and 74, the ends 30 of patterns 18 are preferably folded over and tucked inside the pockets 72 and 74 laterally along the bottom 50 forming openings 80 and 82 respectively, best seen in FIG. 3.

Because of the preferred construction of this particular warmer-server receptacle 10, a single sheet of insulation material 84 can be inserted through the opening 78 to fill the pocket 70 extending from the top of one side along the bottom and up the opposite side. This, as can be seen will fill the pocket between the outer and inner fabric sections of the receptacle 10 in this area. With regard to the pockets 72 and 74, respectively, sheet insulation material 86 and 88, respectively, may be cut in the shape illustrated in ghost lines in FIG. 5 and inserted through the pockets 72 and 74, respectively, formed between fabric sections 52 and 60 and 54 and 62, respectively, as best seen in FIG. 3.

With the insulation material 84 and 86 and 88 positioned within the respective pockets it can be seen that there is a sufficient rigidity whereby the sides will remain in an upright position as illustrated in FIG. 2 forming the receptacle 10 to receive a cooking dish 12. The insulation material 84, 86 and 88 can be of any sheet flexible spongy material such as polyurethane and should be of a thickness sufficient to not only insulate and keep the food within the dish 12 warm but also to prevent the radiation of heat from the dish through the insulation and fabric whereby a surface that it rests upon could be marred or defaced by the heat.

When it is desirable to wash the fabric forming an envelope, the insulation material may be removed by everting the pockets 70, 72 and 74 by use of the openings 68, 70 and 72 or reaching within the openings and withdrawing the insulation.

Because of the flexibility of the sheet insulation material used in this structure, when the receptacle 10 is not in use the sides can be crushed so that the entire unit forms a relatively flat package for storage. When it is desired to use it, it may be removed from the storage area and because of the fact that the insulation material is flexible and spongy, it will return to the shape previously described.

While the principal receptacle 10 is illustrated in the drawings and previously described as generally rectangular in character, it should be realized that the receptacle 10 may be made in any configuration to accommodate a cooking dish of a different shape. As an illustration, the cooking receptacle may be round with an upright endless wall and the warmer-server receptacle 10 could be formed of fabric cut into a particular pattern or patterns to accommodate such a cooking dish wherein pockets are formed to receive appropriately cut insulation material.

Although I have herein shown and described my invention in what I have conceived to be the most practical and preferred embodiment, it is recognized that departures may be made therefrom within the scope of my invention.

I claim:

1. A warmer and server receptacle adapted to receive a hot cooking dish having a bottom and endless upright side and maintain said dish in a relatively hot condition as well as acting as an instrument to prevent said cooking dish from radiating heat and causing injury to a foreign body comprising:
    a fabric envelope having inner and outer sections and said respective sections including a bottom and an endless upright side associated therewith;
    said inner sections forming said bottom and said endless upright side defining an area generally complementary with the exterior configuration of said cooking dish and said envelope including at least one opening for access thereinto;
    insulation material removably positioned within said envelope between said inner and outer sections conforming to the exterior dimensions of said sections and adapted to fill said envelope; and
    said envelope being eversible whereby said insulation material may be removed.

2. A warmer and server receptacle as defined in claim 1 wherein said envelope includes a plurality of separate pockets each adapted to receive insulation material and each pocket includes an opening through the inner sections.

3. A warmer and server receptacle as defined in claim 1 wherein said insulation material is sheet material of a thickness sufficient to prevent outward heat radiation damage.

4. A warmer and server receptacle as defined in claim 1 wherein said inner and outer sections are formed from a plurality of predetermined shape fabric pieces folded and sewn together to form said fabric envelope.

5. A warmer and server receptacle as defined in claim 1 wherein said endless upright side includes a pair of generally vertical upright parallel portions and a pair of generally upwardly outwardly tapered upright parallel portions normal to each of said pair of generally vertical upright parallel portions.

* * * * *